Sept. 22, 1964 J. C. TACKOVICH 3,150,351

COMPUTER MANUAL KEYBOARD ENTRY

Filed Sept. 10, 1957

14 Sheets-Sheet 1

INVENTOR.
JOSEPH C. TACKOVICH

BY Francis V. Giolma

ATTORNEY

Sept. 22, 1964 J. C. TACKOVICH 3,150,351

COMPUTER MANUAL KEYBOARD ENTRY

Filed Sept. 10, 1957 14 Sheets-Sheet 2

Sept. 22, 1964 J. C. TACKOVICH 3,150,351

COMPUTER MANUAL KEYBOARD ENTRY

Filed Sept. 10, 1957 14 Sheets-Sheet 4

Sept. 22, 1964 J. C. TACKOVICH 3,150,351

COMPUTER MANUAL KEYBOARD ENTRY

Filed Sept. 10, 1957 14 Sheets-Sheet 9

United States Patent Office 3,150,351
Patented Sept. 22, 1964

3,150,351
COMPUTER MANUAL KEYBOARD ENTRY
Joseph C. Tackovich, Endwell, N.Y., assignor to International Business Machines Corporation, New York, N.Y., a corporation of New York
Filed Sept. 10, 1957, Ser. No. 683,100
5 Claims. (Cl. 340—172.5)

This invention relates generally to computers, and it has reference in particular to a manual keyboard entry for a computer.

Generally stated, it is an object of this invention to provide a flexible and reliable system for manual entry into a computer of the magnetic drum data processing type.

More specifically, it is an object of the invention to provide in a manual keyboard entry for a computer, for preventing the entry of additional information or data unless a previous entry is completed.

Another object of this invention is to provide for interlocking manual entry latch type keyboard keys with the electronic data entry circuitry of a computer.

Yet another object of this invention is to provide for progressively advancing the sequence of data or information from a manual keyboard to effect serial entry into address and re-add registers.

It is also an object of the invention to provide a serially advancing sequence arrangement of manual keyboard entry for automatically displaying the address after it is read out of the address register.

Another important object of the invention is to provide in a manual keyboard entry system for requiring an operated key to perform a logical function in the electronic information control circuitry in order that a reset signal may be generated to restore the keyboard for permitting further operations.

Yet another important object of the invention is to provide not only for the performance of the logical function in the electronic circuitry upon operation of a manual entry key but also for a correct number of bits of information for the re-add register as a prerequisite to restoring the manual entry keyboard before further operation of the keyboard can be effected.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a schematic diagram of parts of a computer of the magnetic drum type showing an application of the invention.

FIG. 1*a* is a schematic diagram showing details of the switching and timing circuits in connection with the magnetic drum.

FIGS. 2*a* and 2*b* are a schematic diagram of a portion of the manual entry keyboard circuit together with associated keyboard relays and sequencing relays.

FIG. 3 is an isometric view in part of the keyboard showing the interlocking and restore features.

FIGS. 4*a*, 4*b*, 4*c*, 4*d*, and 4*e* are a schematic diagram of another portion of the keyboard entry circuit showing the 2/5 bit translation circuit, and the information and data sequencing circuit together with the restore magnet control circuit and the switching circuits for entering data into the address and re-add registers.

Figure 1:
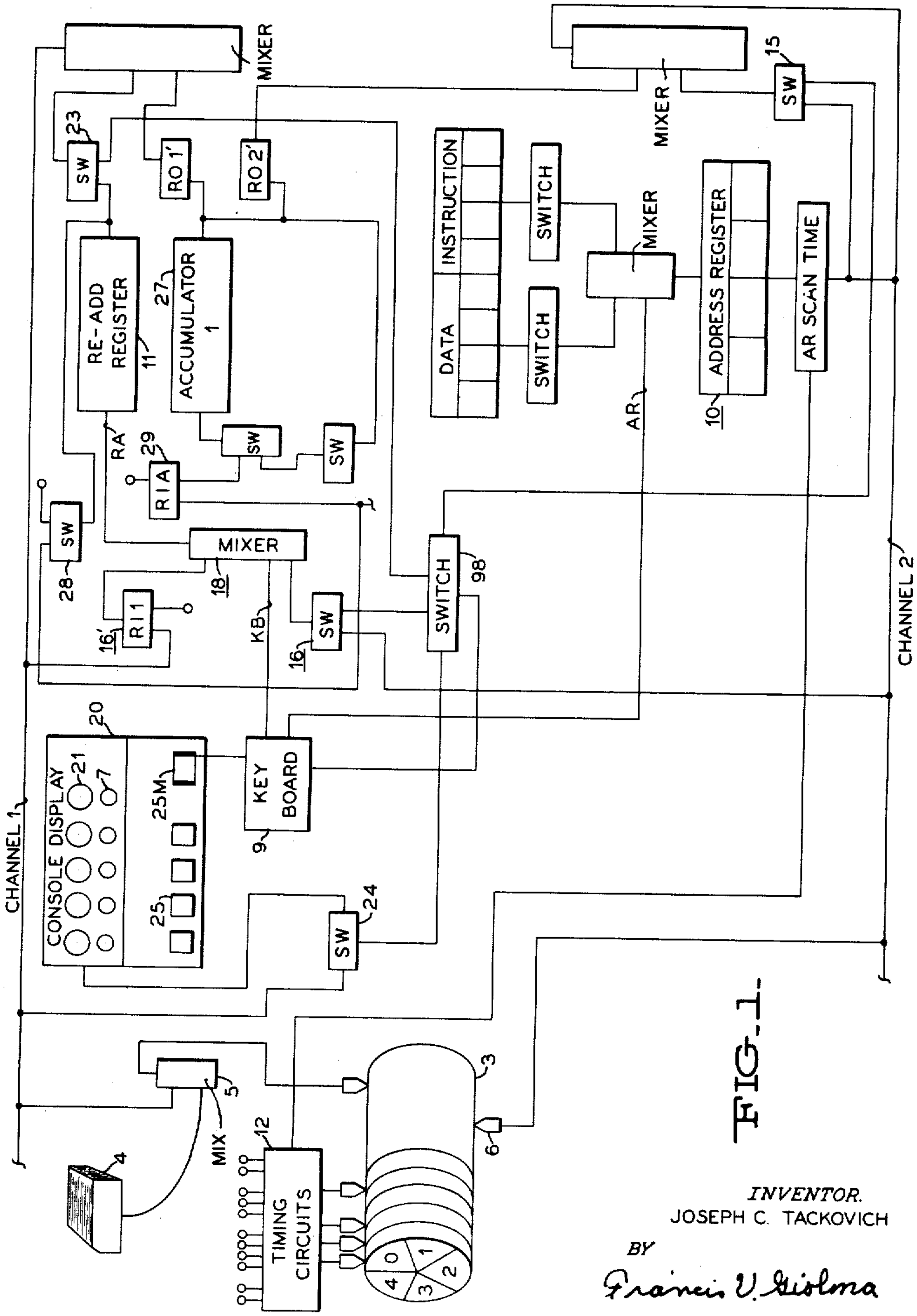

Referring particularly to FIG. 1 of the drawings, it will be seen that a magnetic storage drum 3 is provided on which data from cards 4 or the like may be stored after passing through a mixer 5 when it may be extracted by a reading head 6 and passed to a channel 2. After processing, it may be fed to a channel 1 from where it can be re-entered in the drum 3 if desired.

A manual keyboard 9 is provided for entering address and information data directly into an address register 10 and re-add register 11 of a computer such as the type described in detail in Patent No. 3,037,698, which issued on June 15, 1962, from application Serial No. 15,765 of George J. Saxenmeyer, filed March 17, 1960, and which is a continuation of original application Serial No. 681,849, filed September 3, 1957, now abandoned, under the control of timing circuits designated generally by the numeral 12. When the address which comprises four digits is read into the address register, it is then automatically read out into the re-add register 11 under the control of suitable readout and readin switches 15 and 16 which control the flow of information from the address register to channel 2, and thence through a mixer or well known OR circuit 18 (described hereinafter in column 4, lines 60–70) to the shifting re-add register 11. At the same time the address is read into the re-add register, the keyboard provides for automatically displaying the address on a console display board 20 by means of Nixie display tubes 21 (Burroughs cold cathode glow tubes) of a well-known type, by means of suitable readout and display switches 23 and 24, which control the flow of information from the re-add register 11 to channel 1 and then to the console display board 20. Information is then directed from the keyboard 9 through the mixer 18 to shifting re-add register 11 directly, wherein it is serially entered. It may then be read out or stored in one of the accumulators 27 through operation of readout switch 28 and accumulator readin switch 29.

Operation of the keyboard is interlocked with the entry of information into the address and re-add registers so as to prevent the entry of further information until a restore signal is provided to indicate entry of the information into the particular register. Display push buttons 25 are provided on the console for operating different ones of the readout switches and the display switch 24 to display information in any one of the accumulators such as accumulator 27 which is representative of the plurality used. A magnet **25*m*** provides for restoring any push button which is operated so as to permit automatic display of the address when it is read into the re-add register.

Figure 1A:
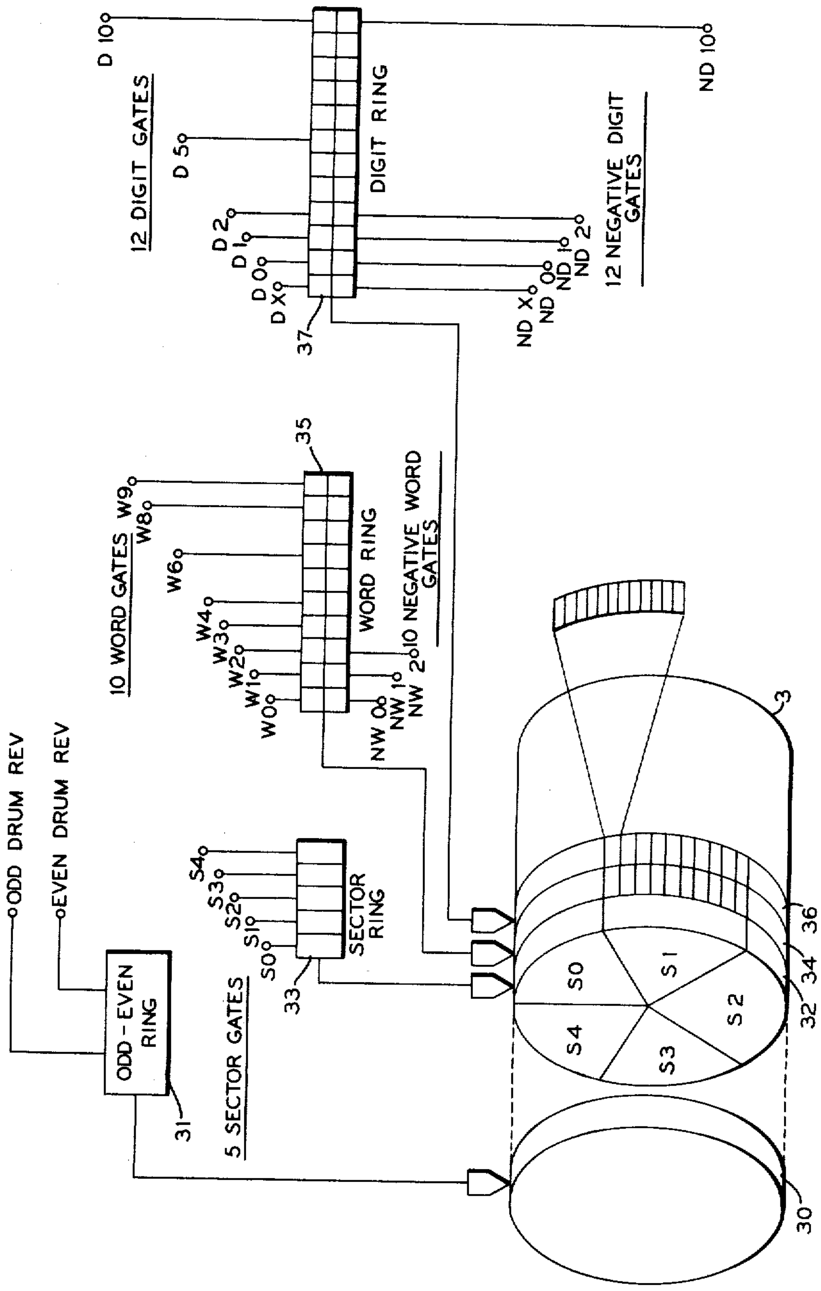

Referring to FIG. 1*a*, it will be seen that the magnetic storage drum 3 which is driven by a motor (not shown) is provided with a plurality of timing tracks. An odd-even timing track 30 is provided which is connected through an odd-even ring drive 31 to terminals for providing signals on odd and even revolutions of the drum. The drum is further provided with a sector track 32 having sectors S0 through S4 which are connected through a sector ring drive 33 to terminals for providing timing signals at terminals S0 through S4, which are used with other timing signals for controlling the entry of address and information data into the computer. Ten word timing signals at terminals W0 through W9 are also provided from a word track 34 of the drum for each sector through a word ring drive 35 which provides also negative word signals. Likewise are provided from a digit track 36 and digit drive ring 37, twelve digit timing signals DX and D0 through D10 for each word, together with their negative components. All of these signals are developed as explained in the aforementioned copending application and also in Patent 2,919,429 to F. E. Hamilton et al. which was filed October 25, 1954, and issued December 29, 1959, and are used in timing the entry of information or data into different portions of the computer as will be explained hereinafter.

Figure 2A:
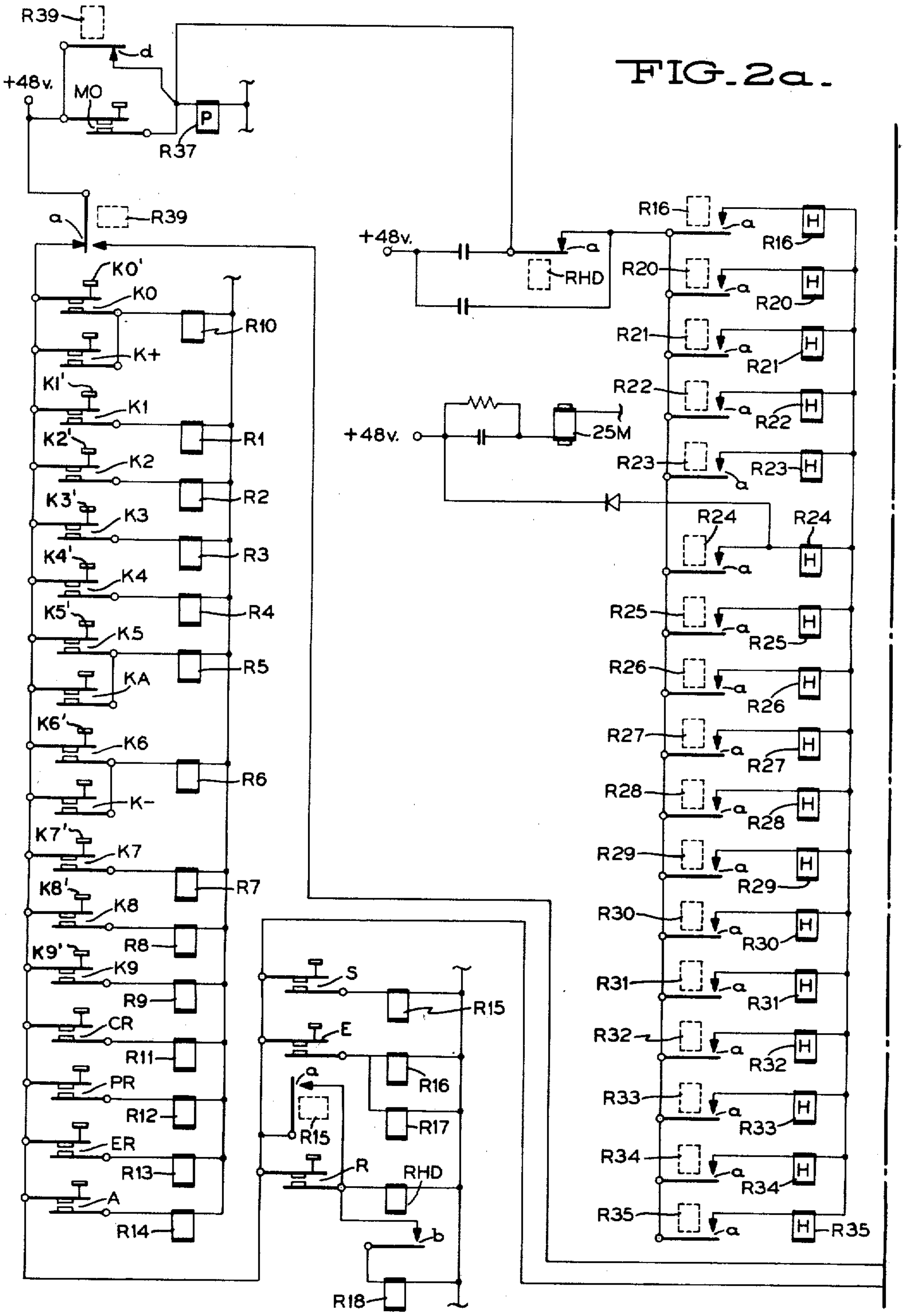

The manual entry keyboard 9 is provided as shown in FIG. 2*a* with a plurality of push type keys K0′ through K9′ as well as K+′, K−′, and KA′ which operate relays R10 and R1 through R9 for producing digit signals to effect the entry of information into the computer through suitable circuitry which will be described hereinafter. The keyboard is also provided with a plurality of control keys; CR for effecting computer reset; PR for effecting program reset; ER for effecting error reset operation; an advance key A; a store key S; an entry key E; and a release key R. Relays R11 through R18 are provided in connection with these keys for controlling the circuitry to effect the desired operation.

Figure 2B:
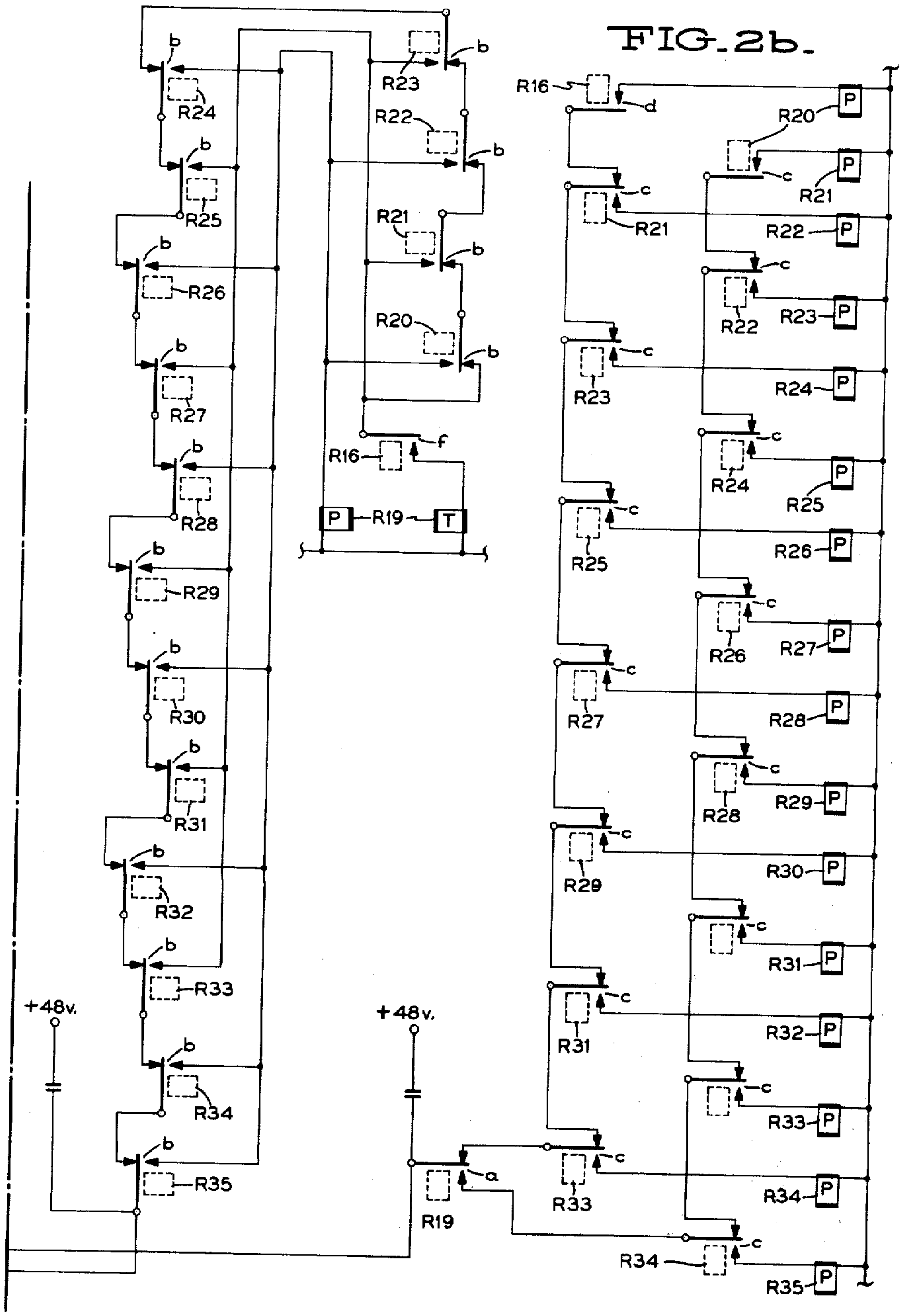
Figure 4A:
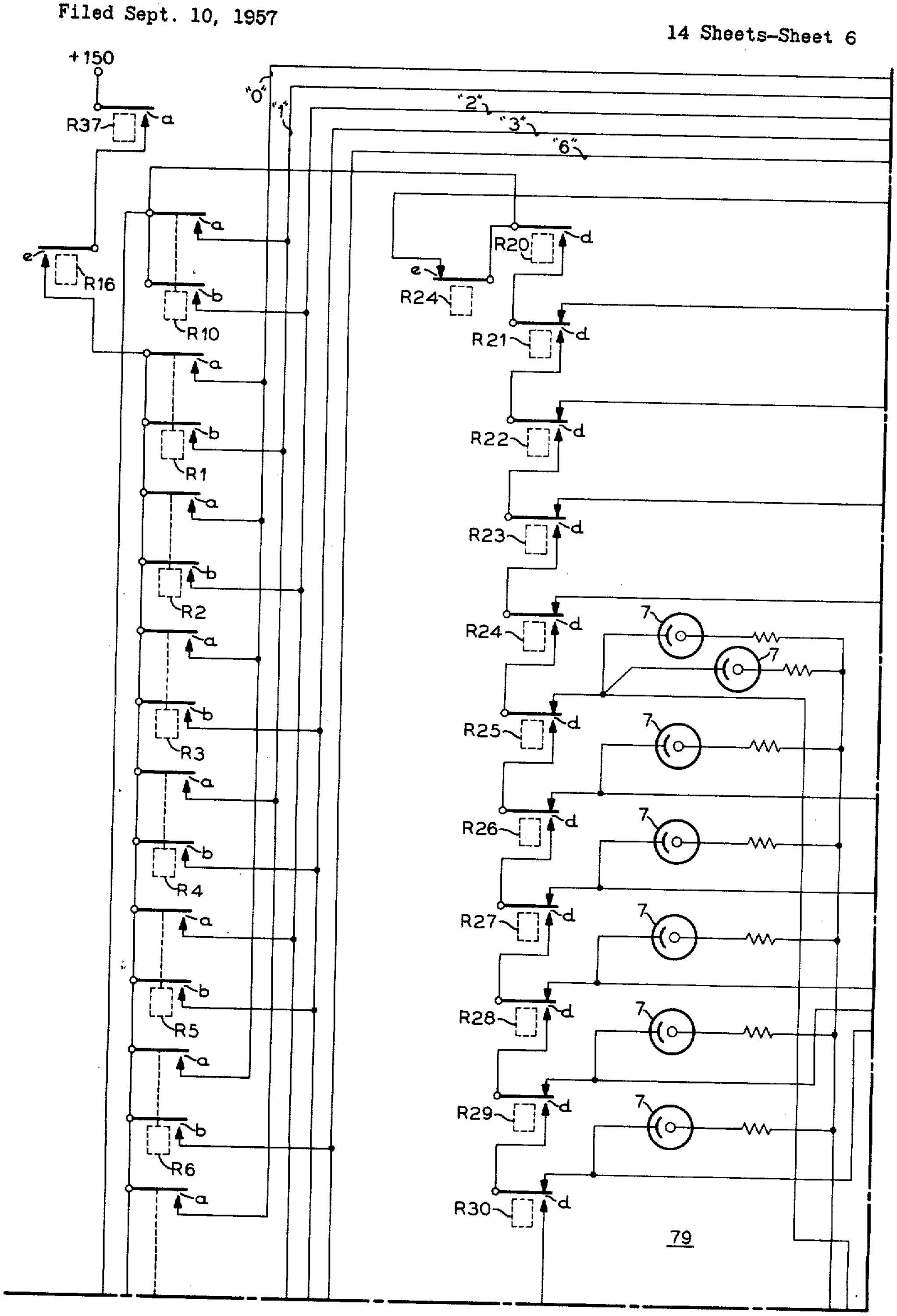
Figure 4B:
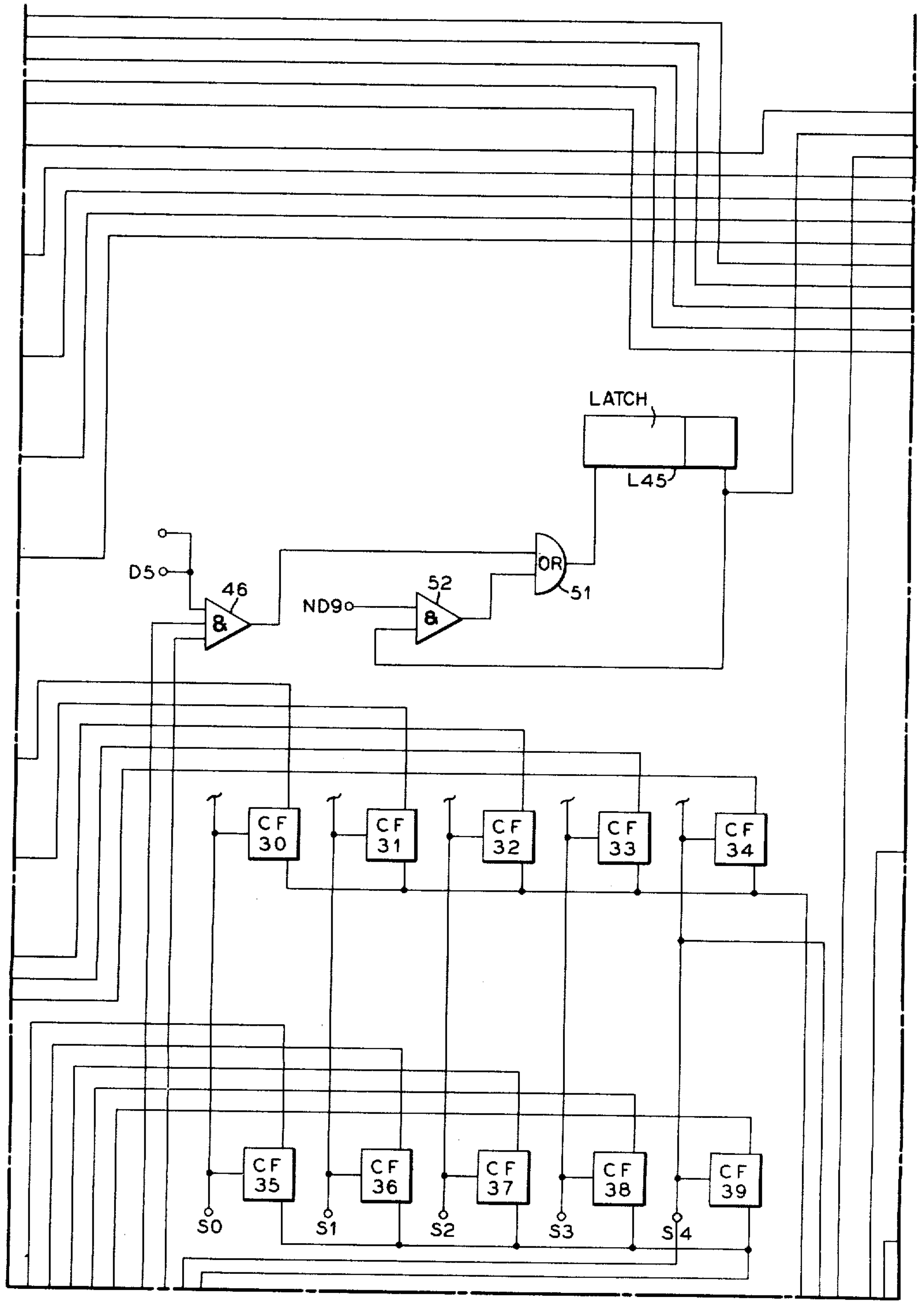
Figure 4C:
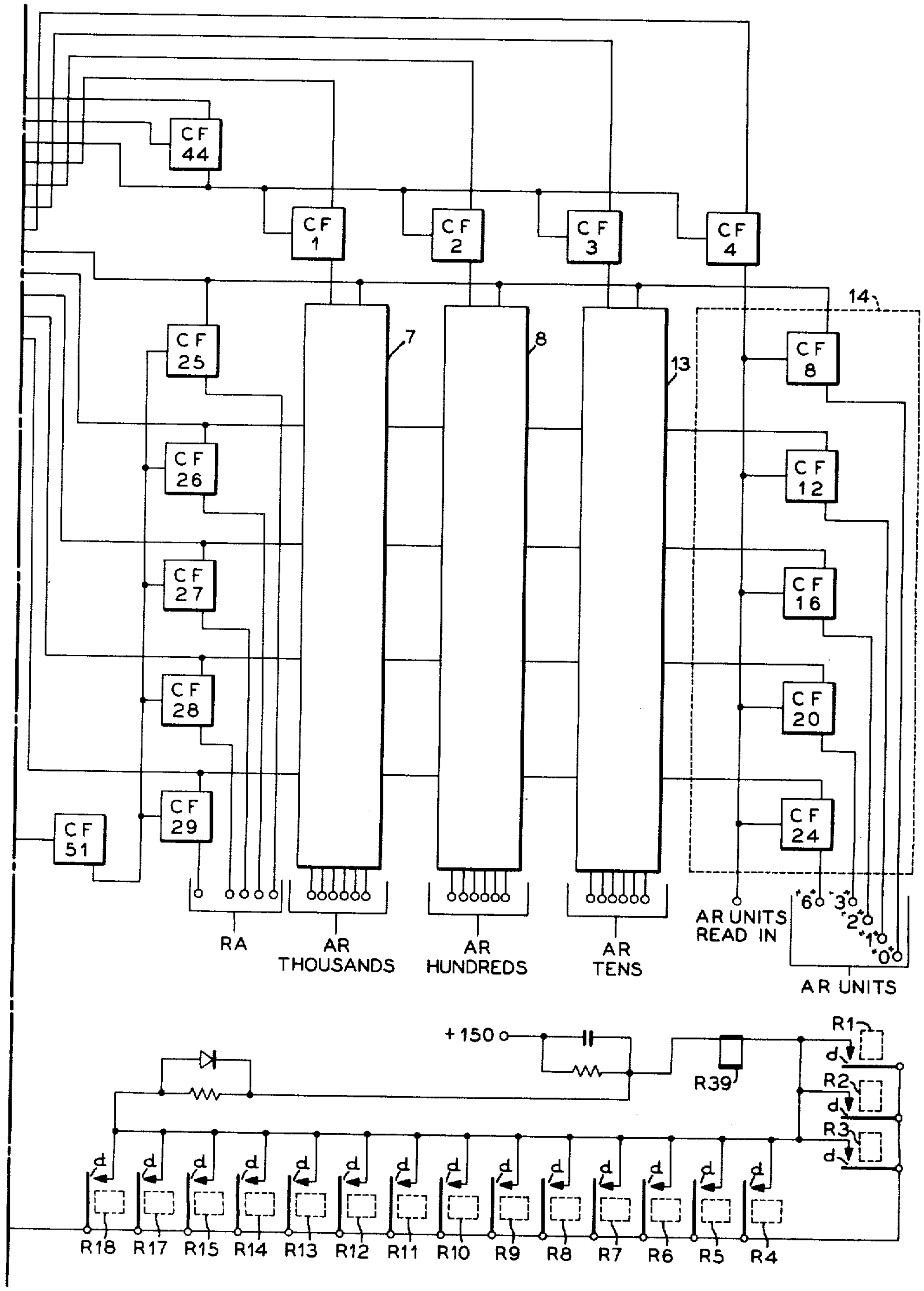

In order to provide for sequencing the address and information signals produced by operation of contacts of relays R0 through R9 in response to operation of different ones of the keys K0′ through K9′, a plurality of sequencing relays R20 through R35 (FIGS. 2*a* and 2*b*) are provided, which provide through contacts thereof (FIGS. 4*a* and 4*d*) basically an open end two-stage relay step ring for directing the signals to the proper address and re-add register positions as shown in FIG. 4*c* and explained hereinafter in detail in columns 5–7. These relays operate in sequence to enter information order by order, high order first under the control of a latch type transfer relay R19 having pick and trip windings R19P and R19T, in conjunction with a transfer type keyboard restore contact 39–*a* operated by a restore magnet 39, which is operated upon the entry of information into the computer to effect the release of whichever key may have been operated.

Figure 3:
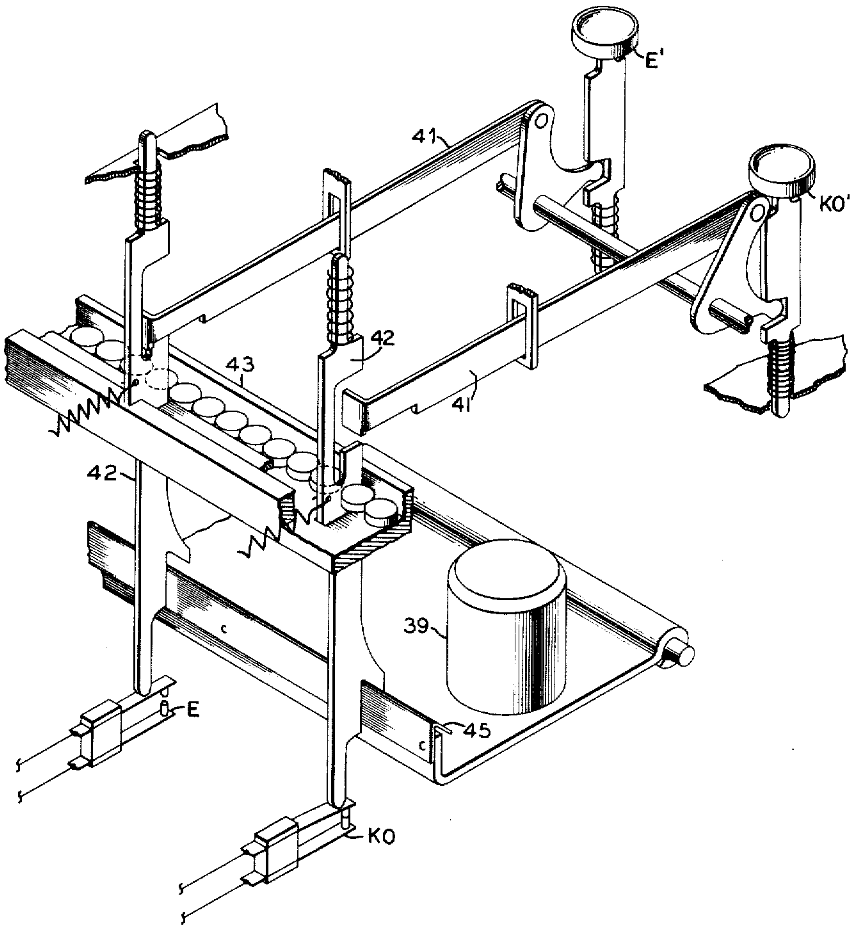

Referring to FIG. 3, it will be seen that the keyboard 9 is basically the same as used with the IBM 024 Punch and operation of a key such as K0′ actuates a slidable switch rod lever 41 to pull it backwardly and release a shoulder portion of a spring-biased switch rod 42 which moves backward against the forward spring bias and downwardly under the action of the vertical spring bias and operates the contact K0 to pick up relay R0. Operation of this switch rod 42 moves it backward between and actuates wafer 43 of an interlock moving the wafers to either side 8 of the rod which jams the wafers and prevents operation of any other keys from releasing their respective switch rods since the wafers are so spaced in the channel support that there is only room for one rod 42 to be moved between them at a time. The restore magnet 39 must be energized to attract upwardly and actuate a pivoted restore and armature bail 45 to reset switch rod 42 by raising it so that it returns to its original position before any further key operations may be subsequently made.

Figure 4D:
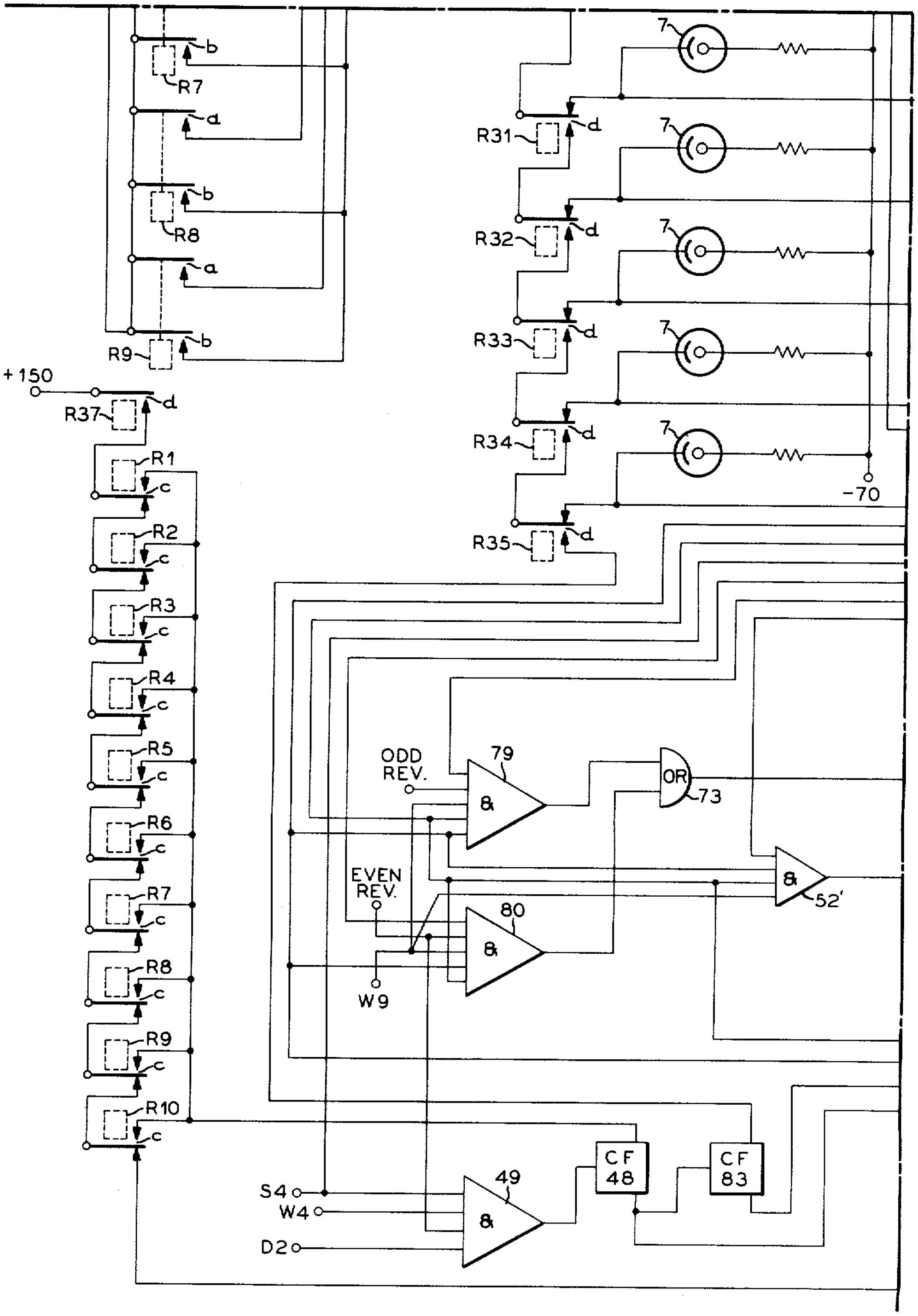

Referring to FIGS. 4*a* and 4*d* of the drawings, it will be seen that N/O contacts R10–*a* and R1–*a* through R9–*a* together with contacts R10–*b* and R1–*b* through R9–*b* of the relays associated with keys at K0′ to K9′ are connected to provide a 2/5 bit data circuit for providing two of the bit signals "0," "1," "2," "3," and "6" for each such key K1′ providing for example a "0" and "1" bit signal, while key K9′ provides a "3" and a "6" bit signal.

In conjunction with the 2-out-of-5 bit data circuit is provided a stepping circuit utilizing transfer contacts R20–*d* through R35–*d* of the relays R20 through R35 for sequentially connecting the 2-out-of-5 bit circuit to serially enter information into the different positions of the address and re-add registers respectively. Contacts R21–*d* through R24–*d* N/C provide connections to a matrix of cathode follower switches (CF5–CR24) for thousands, hundreds, tens, and units entry, typified by cathode follower switches CF8, 12, 16, 20, and 24 shown in FIG. 4*c* for entry to the address register 10, while contacts R26–*d* through R35–*d* provide connections to the re-add register 11 through cathode follower switches CF30–CF39 (FIG. 4*b*). Contact R25–*d* N/C provides a sign sequence signal which is applied to a suitable latch (not shown) in the re-add register 11 through a cathode follower CF40 (FIG. 4*e*), while contacts R1–*d* through R18–*d* N/O of their respective relays are connected in a parallel arrangement for connecting the restore magnet 39 to a thyratron AND switch TH41 for operation in response to a check signal at time W8 provided the entry interlock ER is ON, or cathode follower switch CF42 is ON, which indicates the entry of the information into the particular register selected, or the termination of a non-information entry operation.

Referring to FIGS. 4*a* and 4*c*, it will be seen that the keyboard entry circuit comprises a matrix of cathode follower switches of which only the units switches CF8, CF12, CF16, CF20, and CF24 are shown as typical of the others which are contained in boxes 7, 8, and 13, similar to box 14, for selectively operating under the control of timing signals from the timing circuits 12, the sequencing relays R21 through R24, and the 2-out-of-5 bit signals through cathode follower switches CF1–CF4, for entering an address data into the address register 10 through a keyboard address register entry channel AR, thousands, hundreds, tens, and units positions.

Figure 8:
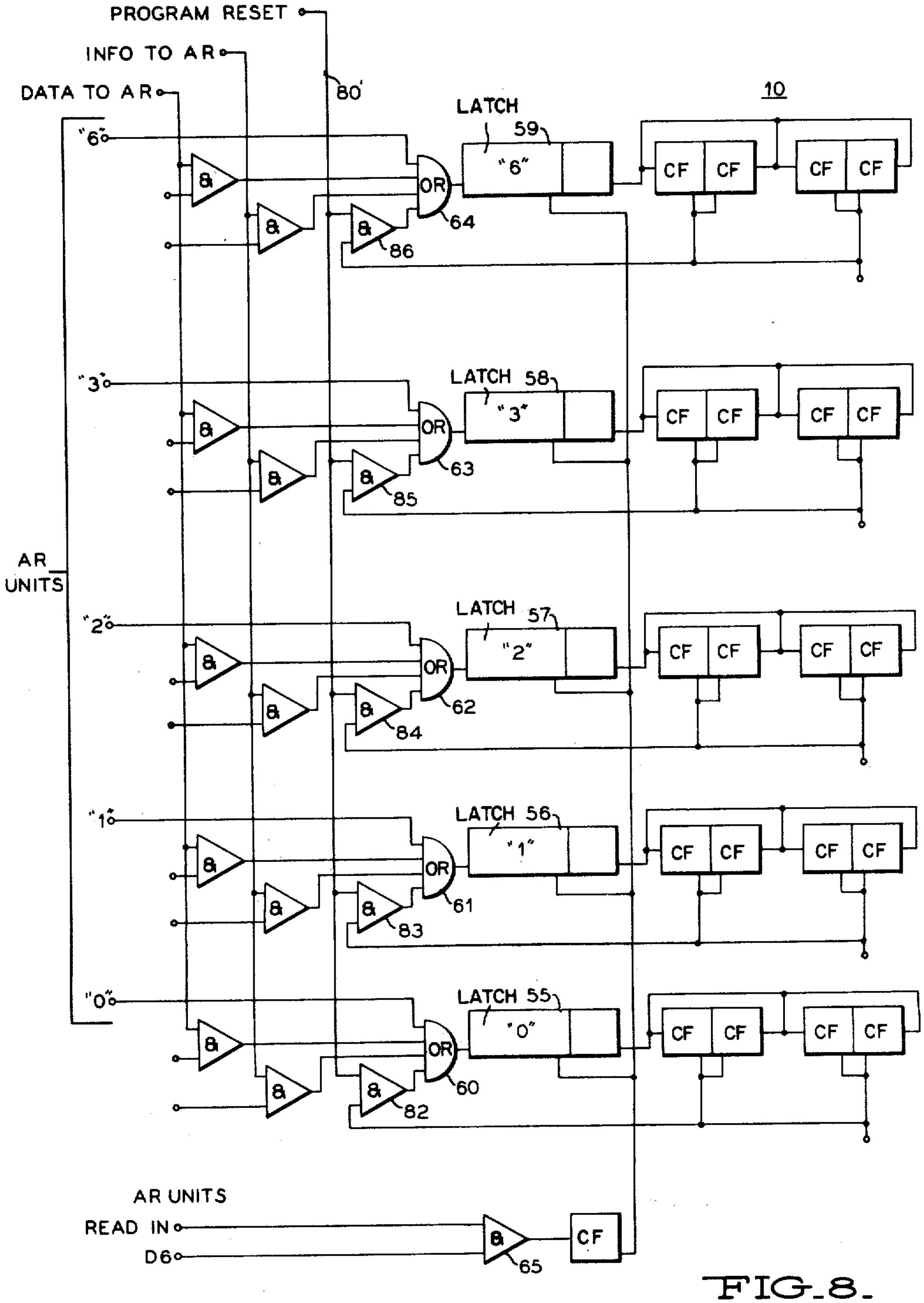
FIG. 8 is a schematic diagram of the address register.

Referring to FIG. 8, it will be seen that the units section of the address register 10, which is typical of the other sections, comprises basically "0," "1," "2," "3," and "6" latches 55–59, which are turned ON by bit signals from the address register entry channel AR during time D5–D9, through OR switches 60–64. All latches are reset by AND switch 65 in response to coincidence of a D6 signal and the keyboard AR readin unit signals from cathode follower switch CF4 and the selected ones are then turned on by the bit signals during the latter portion of the timing period. Reset is effected by a reset signal from the program reset key on conductor 80′ which is dropped from −70 to +10 volts by the operation of program reset key PR which also effects error reset, and thus gets a reset signal through operation of contact R12–*d* (FIG. 4*c*) which provides for operation of the restore magnet 39.

Figure 9:
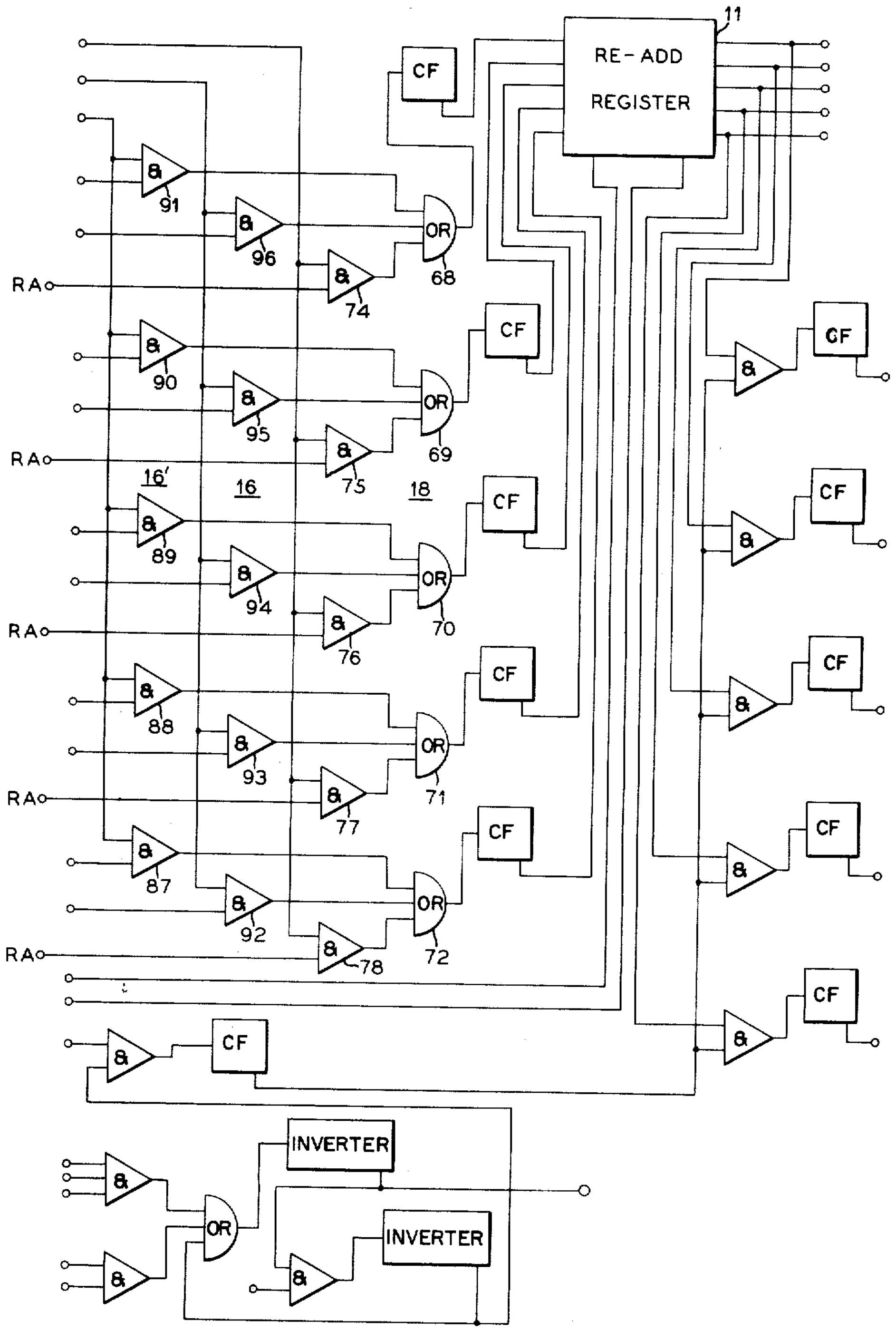
FIG. 9 is a schematic diagram of the re-add register.

Address information is entered into the re-add register 11 of FIG. 9 through a re-add keyboard entry channel RA under the control of cathode follower switches CF25–CF29 (FIG. 4*c*), which are energized in response to information from the 2/5 bit circuit, in conjunction with operation of a cathode follower switch CF40 (FIG. 4*e*) which receives plate voltage from N/C contact R25–*d*, and grid signals from an AND circuit 52′ controlled by the timing circuits 12.

Figure 4E:
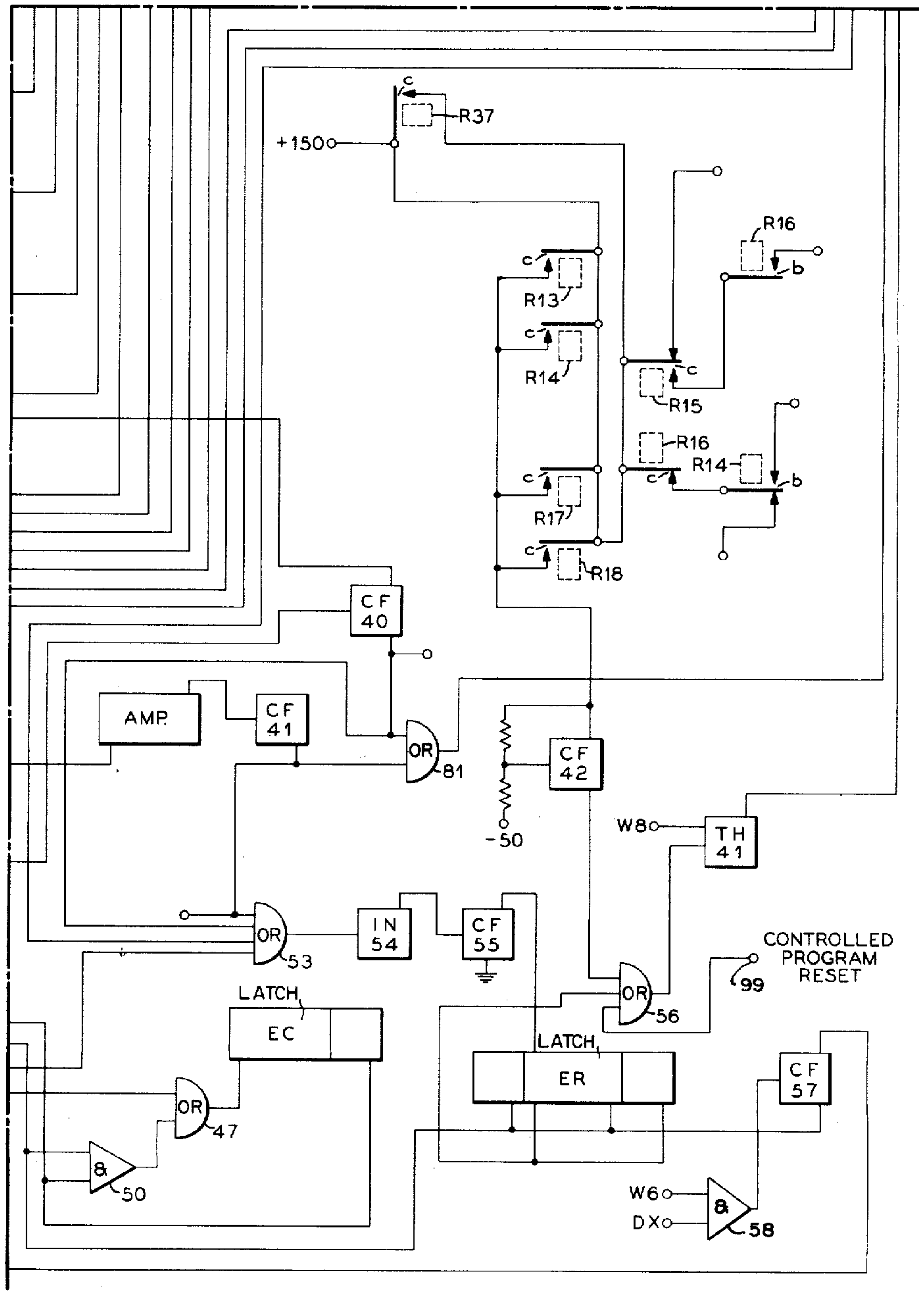
Figure 10:
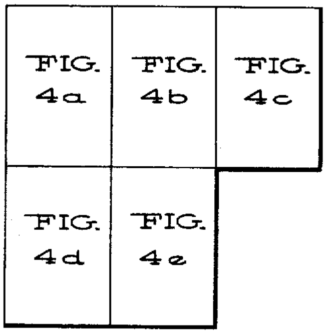
FIG. 10 is a diagram showing the arrangements of FIGS. 4*a*, 4*b*, 4*c*, 4*d*, and 4*e*.

Referring to FIG. 9, it will be seen that the re-add register 11 comprises the mixer 18 of FIG. 1 which includes OR mixers 68–72 for the "0" through "6" bit signals from channels 1 and 2 and the keyboard 9. AND switches 74–78 provide for reading in bit signals from the re-add keyboard channel KB in conjunction with a re-add keyboard readin keyboard signal from the keyboard entry circuit cathode follower switch CF 41 (FIG. 4*e*). AND switches 87–91 comprise a readin switch 16′ from channel 1, while AND switches 92–96 comprise readin switch 16 from channel 2.

Information or data is entered into the address register in sequence, high order first, by the closing of contacts R21–*d* through R24–*d* (FIG. 4*a*), which energize the respective switch portions of the keyboard entry matrix shown in FIG. 4*c*. When contact R24–*d* N/C is energized following operation of sequence relay R23, the units readin channel of AR will be energized by signals from the 2/5 bit circuit, and two out of the five bit latches "0," "1," "2," "3," and "6" of the units register will be energized to register the desired information.

Figure 7:
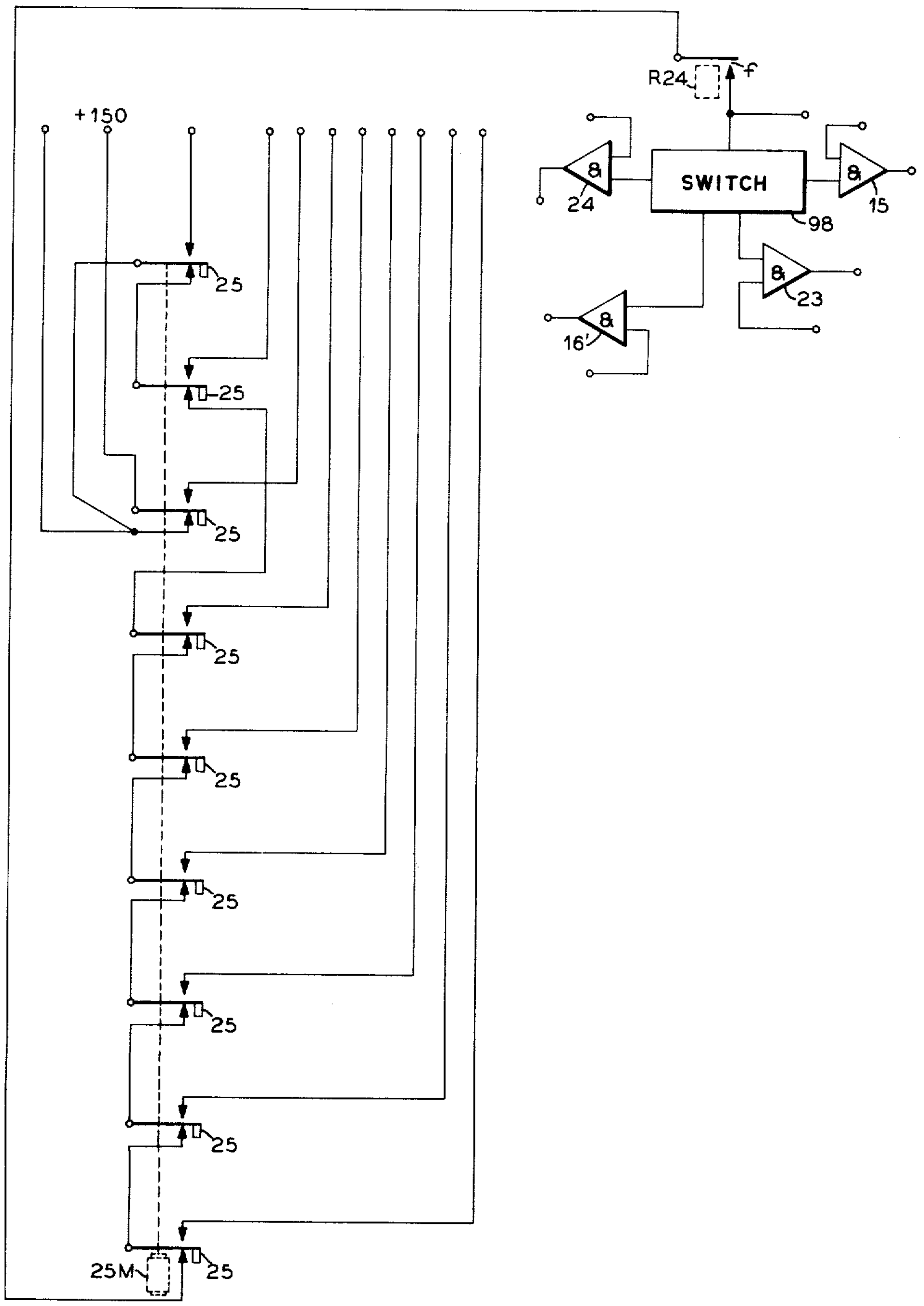
FIG. 7 shows an automatic display portion of the keyboard entry circuit.

After the units information of the address register has been read in, sequence relay R24 operates, and closes contact R24–*f* to effect operation of the switches 15, 16, 23, and 24 through switch 98 (FIGS. 1 and 7) to read out the data content from the address register 10 into the re-add register 11 and display it on the console display 20. The information together with its sign is thereafter serially read into the re-add register RA by operating different ones of the keys K0′–K9′ which effect operation of sequence relays R24 through R34, and through contacts R25–*d* through R35–*d* of the sequence relays, sequentially connect the 2/5 bit information circuit, as shown in FIGS. 4*a*, 4*b*, and 4*c* of the drawings, to the re-add portion of the keyboard entry circuit. This circuit also through contacts R25–*d* through R34–*d* N/C, provides for lighting positional neon lamps 7 to indicate the position in which information is entered, as well as controls the operation of the switches for the re-add keyboard channel RA of FIG. 4*b*, which is connected to the re-add register 11 as shown in FIGS. 4*c* and 9, by the re-add channel RA. Bit signals are transferred by the re-add keyboard channel for operating the plurality of switches CF25 through CF29 for entering bit information into the register.

In order to enter information into any one of the registers, the manual operate key M0 must be closed, thus providing an obvious circuit for the manual operate relay R37 (FIG. 2*a*). The entry key E must be operated to effect entry of information into the computer, and this provides an obvious energizing circuit for relays R16 and R17. Relay R16 provides an energizing circuit for the trip coil R19T of the latch relay at the contact R16–*f* through a circuit including the N/C contacts –*b* of relays R20 through R35 (FIG. 2*b*) and the N/C contact 39–*a* of the restore magnet 39 (FIG. 2*a*) to make sure that relay R19 is not in the latched position. A hold circuit is provided for relay R16 through contact R16–*a*. Contact R16–*c* (FIG. 4*e*) opens to prevent the start of a program if the space key (not shown) should be hit, since the space key performs two functions—program start and space. Contacts R37–*a* and R16–*e* (FIG. 4*a*) connects the 2/5 bit information circuit to the source, while contacts R16–*b* (FIG. 4*e*) set up a store function. Contacts R17–*d* (FIG. 4*c*) of relay R17 which was picked up with relay R16 set up the plate circuit thyratron switch TH41 for the restore magnet 39. Contact R17–*c* connects the cathode swith CF42 of FIG. 4*e* to the source for providing a signal for effecting operation of the keyboard restore magnet 39 to restore the entry key E in the absence of a signal from the entry of information. Energization of the restore magnet 39 attracts its armature upwardly and operates the restore bail 45 of the manual entry keyboard to release the entry switch E and permit the entry of information by the operation of one of the information keys.

When the keyboard restore transfer contacts 39–*a* of FIG. 2*a* transfer, the operating windings of relays R16 and R17 are de-energized. Relay R16 is held up through its hold circuit through contacts R16–*a* (FIG. 2*a*), but relay R17 drops out. Relay R20 is thereupon picked up by energization of its pick winding R20P through the normally open keyboard restore contacts 39–*a*, contacts R19–*a* and N/C contacts R33–*c*, R31–*c*, R29–*c*, R27–*c*, R25–*c*, R23–*c*, R21–*c*, and contact R16–*d*. Contact R17–*d* opens when relay R17 drops out, thus interrupting the energizing circuit for the restore magnet 39 at contacts R17–*d*, and the restore magnet is de-energized, closing N/C contact 39–*a*. The normally closed contacts 39–*a* of the restore magnet 39 provides an energizing circuit for the pick coil R19P (FIG. 2*b*) of the latch relay R19, through contacts R20–*b* of relay R20. Relay R19 latches up and contacts R19–*a* of relay R19 transfers and sets up a circuit for operation of the following sequence relay R21 when the restore magnet N/O contact 39–*a* next closes.

Should one of the keys, for example K2′, next be operated, contact R2–*a* and R2–*b* energize the "0" and the "2" bit circuits of the 2/5 bit circuit. A circuit is thereupon provided through the N/C contacts R21–*d* of sequence relay R21 to the thousands position of the address register matrix for operating selected ones of the matrix switches. Since the "0" and "2" bit signal circuits from the 2/5 bit circuit are energized, this results in the "0" and "2" bit switches CF5 and CF13 of box 7 of the keyboard address register thousands channel being energized, and the thousands information is entered into the address register 10 at the proper timing. This timing is obtained through the operation of a keyboard address interlock switch CF44 which has its plate circuit energized through contact R24–*e* N/C and which is turned ON by a signal from an interlock latch L45, which is in turn turned ON in response to entry interlock OFF and entry control ON signals from the entry interlock switch ER and the entry control latch EC, in response to a keyboard relay transferred signal, and timing signals from sector 4, word 4, and digit 2.

Operation of the entry interlock latch ER (FIG. 4*d*) at time ND9 provides an interlock signal for the keyboard restore magnet switch TH41 so that this switch operates upon receiving a timing signal W8 and completes an energizing circuit for the restore magnet 39 through contact R2–*d* (FIG. 4*c*). The restore magnet 39 operates, and the restore transfer contacts 39–*a* shift. Contacts R2–*d* open in the energizing circuit of the restore magnet 39, and the normally closed contact 39–*a* of the restore magnet energizes the trip winding R19T of the latch relay R19, so as to effect transfer of contacts R19–*a* and set up an energizing circuit for the next sequence relay R22 which will be operated at the termination of the address hundreds position.

Entry of the hundreds and tens data follows in a similar manner, and when the manual entry keyboard key is operated for the units position of the address register 10, particular ones of the switches CF8, –12, –16, –20, and –24 for example CF8 and CF16 in the keyboard entry matrix of FIG. 4*c*, will be energized to effect energization of two out of the five conductors of the units address register channel UR1 in a manner similar to that hereinbefore described for the thousands channel. Upon energization of the units channel conductors, for example "0" and "2," the "0" and "2" bit latches 55 and 57 will be turned ON by bit signals of timing D5–D9 to store the appropriate signal in the address registers as follows: plate voltage is applied to the switches CF8 and CF16 by the "0" and "2" bit signals from the 2/5 bit signal circuit. Grid voltage is applied from cathode follower switch CF4′, which gets its plate voltage from the sequencing circuit through contacts R24–*d* N/C (FIG. 4*a*) and R20–*d* N/O, R21–*d* N/O, R22–*d* N/O, and R23–*d* N/O, and its grid signal from a keyboard address interlock switch CF44. CF44 gets its plate voltage from the source through interlock contact R24–*e* N/C and contact R20–*d* N/O, and its grid signal from a latch L45 which is turned ON by timing signal D5 through an AND switch 46, and OR 51, provided that the entry interlock latch ER is OFF, and the entry control latch EC is ON.

The entry control latch EC (FIG. 4*e*) is turned ON through OR circuit 47 by the operation of key relay R2 through contacts R2–*c*, which apply plate voltage to switch CF48, and AND switch 49 (FIG. 4*d*), which provides grid voltage in response to timing signals S4, W4, D2, and even drum revolution signals from the timing circuits 12.

EC stays ON so long as ER stays OFF, by reason of a latch back signal applied to AND switch 50, and an OFF signal from the entry interlock ER causing a signal to be applied to EC through OR 47.

Latch L45 is turned OFF at timing signal D9 by reason of the loss of the ND9 (Not D9) signal at the time causing AND switch 52 to block. CF44 is turned OFF, as is OR circuit 53. Inverter 54 which is turned on by OR 53 is capacitor coupled to, and applies a pulse to switch CF55 to turn ER ON. This blocks AND switch 46 (FIG. 4*b*) by removing the OFF signal of ER and turns it OFF for the next D5 signal.

The ON output of interlock ER is applied through OR 56 to switch TH41, and in conjunction with the next W8 timing signal turns TH41 ON, to energize the restore magnet 39, which starts to mechanically reset key K2' to release relay R2 which initiated the operation at R2–*c*. Contacts R19–*a* of R19 transfer and energize the next sequence relay R24 through the circuit set up through contacts R23–*c*. When R2 is released, N/C contacts R2–*c* apply plate voltage to switch CF57, and the W6 and DX signals from timing circuits 12 turn AND 58 ON to apply grid voltage. CF57 applies voltage to ER to turn it OFF and energize switch TH41.

The keyboard restore magnet 39 is energized by operation of the keyboard restore switch TH41 (FIGS. 4*c* and 4*e*) when the entry interlock latch ER is operated to apply voltage as described hereinbefore. Sequence relay R24 is thereupon operated and contacts R24–*d* N/C (FIG. 4*a*) open, indicating an end of the address. Contacts R25–*d* N/C provide a circuit for operating the sign sequence switch CF40 for operating appropriate latches in the re-add register to register the sign of the information in response to transmission of the appropriate 2-out-of-5 bit signal in the usual manner in response to operation of AND switch 52' in response to S4, W9, and entry interlock "OFF" and entry control "ON" signals.

Upon the operation of sequence relay R24, a circuit is provided through contact R24–*f* (FIG. 7) to effect operation of the necessary switches including switches 15, 16, 23, and 24 through a switching circuit designated generally in FIG. 1 by numeral 98 (and which serves as a driver to provide the necessary outputs in response to the closure of contacts R24–*f*) to read the information out of the address register 10 into channel 2, and then from channel 2 into the re-add register 11 from which it is read out onto channel 1 and then to the console display 20 where it is displayed in a plurality of Nixie display tubes 21 of a type well known in the art. As information is keyed into the re-add register from the keyboard, the sequence relays R25 through R34 operate in sequence to transfer the information to the proper position in the register through contacts R25–*d* through R35–*d*, which also provide energizing circuits for positional indication neon lamps 7 which shift in sequence from left to right as information is keyed. Operation of relay R24 closes N/O contacts R24–*a* and connects the release magnet 25*m* to be energized and release any one of a plurality of display selection buttons 25 on the console, so as to permit automatic display of the address as explained hereinbefore.

Sequence relays R25–R35 continue to operate in sequence each time one of the keys of the keyboard is operated to enter information in the re-add register 11. Information is entered through channel RA by selective operation of cathode follower switches CF25–CF29 (FIG. 4*c*) depending on which bit signals are supplied from the keyboard bit circuit of FIG. 4*a* to the plate circuits. Grid signals are furnished by a cathode follower switch CF51 which is turned ON by a signal from switch cathode follower CF41 in response to a signal from OR circuit 73 in response to operation of AND switches 79 and 80 (FIG. 4*d*). Switches 79 and 20 are turned ON during odd and even drum revolutions respectively, as a result of signals from the odd-even ring 31 of FIG. 1*a*, timing signals W9, entry interlock ER OFF, entry control EC ON, and information signals from the re-add entry matrix switches CF30–CF39. These switches have information signals applied to their plates by contacts R26–*d* through R34–*d*, and receive grid signals from the sector ring 33 at times S0 through S4.

Operation of either AND 79 or 80 provides a re-add readin keyboard signal from cathode follower switch CF41 through OR 73. OR 73 also turns ON OR 81 which operates cathode follower switch CF51 to turn ON selected ones of the re-add entry switches CF30–CF39 to energize particular ones of the "0," "1," "2," "3," and "6," bit conductor of channel RA.

The output of CF41 turns OR 53 ON, and this in turn turns the entry interlock latch ER ON (FIG. 4*e*). The output from ER turns the entry control latch EC OFF by removing the OFF output from AND 50, and through OR 56 turns thyratron switch TH41 ON to energize the restore magnet 39. Operation of the restore magnet releases the operated key and effects operation of contact 39–*a* (FIG. 2*a*) to trip latch relay R19 (FIG. 2*b*) and provide for advancing the sequence by effecting operation of sequence relay R26. This operation continues in sequence as different keys are operated.

Figure 6:
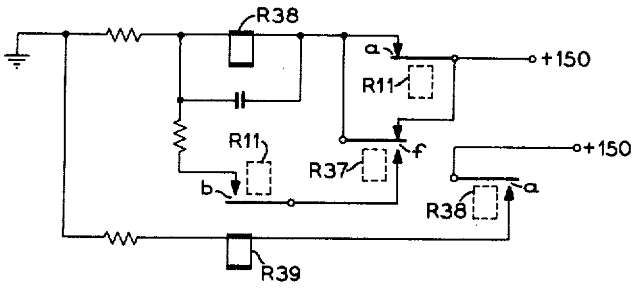
FIG. 6 is a schematic diagram of an automatic reset portion of the keyboard entry circuit.

Operation of the computer reset key CR energizes relay R11 and as shown in FIG. 6 the contact R11–6 provides a shunt about relay R38 dropping it out. The contacts R38–*b*, –*c*, and –*d* (FIG. 5) close to provide error reset, program reset and computer reset signals which operate into the computer to perform all of these functions. When the program reset key PR is energized, relay R12 picks up and contacts R12–*b* close to provide an error reset signal also. Contact R12–*a* also closes to energize conductor 80' which connects to the address register as shown in FIG. 8. Release of the computer reset and program reset keys is effected by operation of the restore magnet through operation of a controlled program reset switch which provides a signal at terminal 99 through a signal back from the program portion of the computer. When the error reset key ER is operated, relay R13 is energized and a reset signal is transmitted, reset of the key ER being effected by operation of the restore magnet by the closing of contacts R13–*c* which provide a signal in lieu of operation of the entry interlock latch ER for operating the keyboard restore magnet switch 39. Operation of the advance key A effects operation of relay R14 and contacts R14–*c* (FIG. 4*e*) also provides for operation of the keyboard restore magnet 39 through TH41 so as to effect a stepping sequence without requiring operation of an information key. In this way either all or part of the information which the operator wishes to change may be corrected. When the release key R is operated, the heavy duty relay RHD is energized and provides an energizing circuit for relay R18. The *a* contact of the RHD relay opens de-energizing the sequence relays R20 through R35 (FIG. 2*a*) as well as relay R16. Contact R18–*d* connects the restore magnet 39 in the plate circuit of the keyboard restore switch TH41 and contacts R18–*c* apply plate voltage to the auxiliary keyboard restore switch CF42 which provides a signal for the keyboard restore switch in lieu of a signal from the entry interlock latch ER. When power is first turned ON, an automatic reset signal is developed by virtue of a capacitor C connected across the coil of relay R38 (FIG. 6) which delays operation of relay R38, since relay R39 is de-energized at the time, relay R37 will be momentarily energized through contact R39–*d* and a positive ten volt signal is applied through contact R37–*g* (FIG. 5) to the program error and computer reset circuits for effecting a reset operation to clear the equipment.

Figure 5:
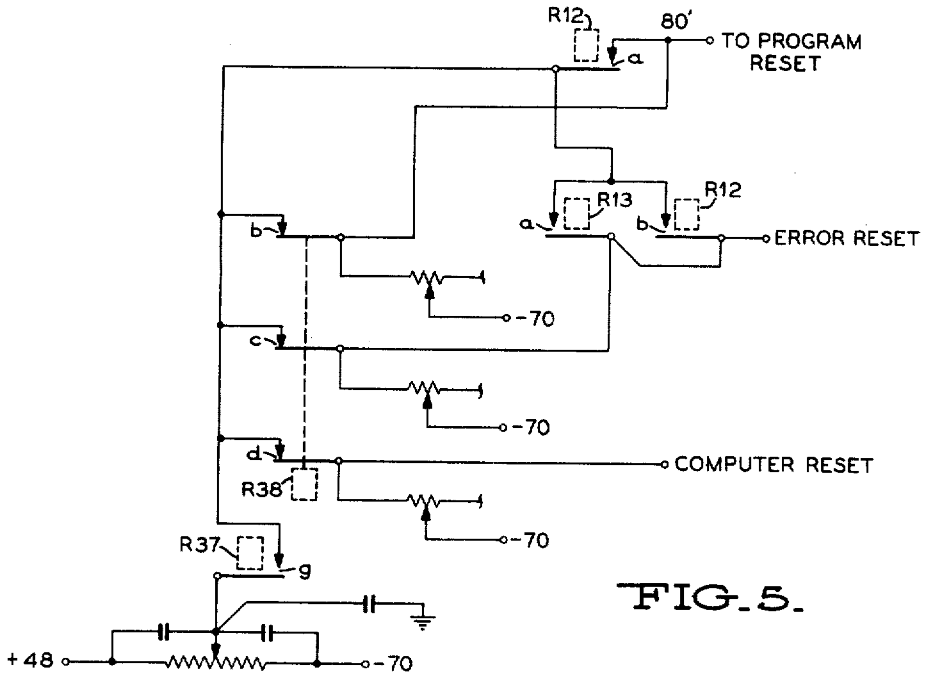
FIG. 5 is a schematic diagram of a reset portion of the keyboard entry circuit.

When the program reset key PR is operated, a circuit is provided through contacts R12–*a*, as shown in FIG. 5, to reset numerous latches throughout the computer as typified by the reset signal which resets latches 55–59 by transferring the connection of conductor 80' from —70 to +10 volts and blocking AND switches 82–86 of FIG. 8 to turn the latches off.

Should an extra information key be operated N/O contact of FIG. 4*c*, R35–*d* provides a reset signal which operates inverter 54 of FIG. 4*d* through cathode follower switch CF83 and turns the entry interlock switch ER ON to restore the keyboard restore magnet 39 through TH41.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a computer having a plurality of registers, manual keyboard entry means having a plurality of keys of the latch type, circuit means activated by different ones of the keys to produce predetermined data signals, sequencing means operated by the keys in a step by step manner, switch means jointly operated by operation of the keys and sequencing means to selectively apply predetermined signals to different ones of the registers in predetermined order, entry control means activated by entry of signals to a register, and restore means operable to prevent operation of the keys, said restore means being rendered effective in response to operation of any one of said keys and ineffective in response to operation of the entry control means.

2. In combination, a pair of registers, a manual entry keyboard having a plurality of keys, interlock means activated by operation of one key for locking said key in the operated position and preventing operation of more than one key at a time, a restore magnet operable to release any operated key, a bit circuit operable to produce different combinations of bit signals for operation of each key, sequencing means operated one step at a time by each of the keys to enter the bit signals in one of the registers in a predetermined order column by column, and provide for transfer from one register to the other at a predetermined point in the sequence, means operated by the entry of bit signals to effect operation of the restore magnet, circuit means connecting the bit circuit to the other register at said predetermined point, and means operated by the entry of bit signals into the other register to effect operation of the restore magnet.

3. The combination with a plurality of registers, of a plurality of manually operated keys, switch means operated by said keys and having contacts, circuit means including contacts of said switch means for producing 2 out of 5 bit data signals, sequencing means operated one step at a time in response to each operation of said switch means, a matrix of switch devices selectively controlled by the sequencing means and the data signals to sequentially enter the signals into one of the registers, transfer means controlled by the sequencing means to transfer the signals to the other registers, and circuit means controlled by the sequencing means to enter subsequent data signals into another one of the registers.

4. In a manual entry circuit for reset and address registers of a computer, a keyboard having a plurality of keys, relay means operated by the keys, interlock means for said keys operated by any one of said keys to prevent operation of any other one of said keys, release means for said interlock means to permit operation of another one of said keys, circuit means controlled by said relay means to set up an energizing circuit for the release means, switch means operable to complete said energizing circuit, circuit means selectively controlled by the relay means to produce predetermined data signals, sequencing means controlled by said release means, other interlock means selectively controlled by the sequencing means and predetermined ones of a plurality of timing signals, read-in switches selectively controlled by the sequencing means, the other interlock means and said data signals to enter them in the address register, entry interlock means operated by the aforesaid other interlock means to effect operation of the switch means, and means operated by the release means for controlling operation of the sequencing means.

5. In combination with a computer having a register with a plurality of positions, a keyboard having a plurality of data and function keys, interlock means including a latch to secure each key in an operated position and means actuated by an operated key to prevent operation of another key while a key is operated, circuit means operated by the data keys for producing data signals, sequence means operated one step at a time in response to operation of each key of the keyboard to sequentially connect the circuit means to the register for entering data into the register positions in a predetermined sequence, means responsive to the entry of data in one position of the register to release said latch means, and circuit means operated by one of the function keys for operating the sequence means independently of the data keys to permit entry of data in any one position of the register without altering data in the other positions.

References Cited in the file of this patent

UNITED STATES PATENTS

| | | |
|---|---|---|
| 1,945,837 | Thompson | Feb. 6, 1934 |
| 2,318,299 | Doty | May 4, 1943 |
| 2,629,549 | Butler | Feb. 24, 1953 |
| 2,654,812 | Cunningham et al. | Oct. 6, 1953 |
| 2,798,554 | Smith | July 9, 1957 |
| 2,842,757 | Evans | July 8, 1958 |
| 2,885,659 | Spielberg | May 5, 1959 |
| 2,910,238 | Miles et al. | Oct. 27, 1959 |
| 2,911,622 | Ayres | Nov. 3, 1959 |
| 2,911,624 | Booth | Nov. 3, 1959 |
| 2,919,429 | Hamilton et al. | Dec. 29, 1959 |
| 3,053,449 | Hoberg et al. | Sept. 11, 1962 |